United States Patent [19]

Matsui

[11] Patent Number: 4,990,020
[45] Date of Patent: Feb. 5, 1991

[54] ASSEMBLING DEVICE

[75] Inventor: Kazuhiro Matsui, Aichi, Japan

[73] Assignee: Kabushiki Kaisha Kojima Shohten, Tokyo, Japan

[21] Appl. No.: 400,446

[22] Filed: Aug. 30, 1989

[30] Foreign Application Priority Data

Sep. 13, 1988 [JP] Japan ................. 63-229071

[51] Int. Cl.⁵ .................. B25G 3/00; F16B 1/00
[52] U.S. Cl. ...................... 403/20; 403/245; 403/407.1
[58] Field of Search .............. 403/407.1, 246, 264, 403/231, 245, 19, 20

[56] References Cited

U.S. PATENT DOCUMENTS

| | | | |
|---|---|---|---|
| 4,131,376 | 12/1978 | Busse | 403/231 X |
| 4,345,849 | 8/1982 | Stenemann | 403/252 |
| 4,549,831 | 10/1985 | Lautenschlager | 403/231 |
| 4,582,446 | 4/1986 | Salice . | |
| 4,599,011 | 7/1986 | Tashiro et al. | 403/407.1 X |
| 4,664,548 | 5/1987 | Brinkmann | 403/14 |
| 4,693,630 | 9/1987 | Giovannetti | 403/405.1 |
| 4,787,769 | 11/1988 | Michael | 403/252 |

FOREIGN PATENT DOCUMENTS

2546751 4/1977 Fed. Rep. of Germany .
2855216 7/1979 Fed. Rep. of Germany .
61-19117 1/1986 Japan .

Primary Examiner—Andrew V. Kundrat
Attorney, Agent, or Firm—Flynn, Thiel, Boutell & Tanis

[57] ABSTRACT

An assembling device for releasably fixedly securing first and second plate-like members together includes a main case mounted on the first member and having an opening for receiving therein a hook member fixed to and projecting from the second plate-like member. A rotary body is rotatably disposed in the main case and includes structure defining a cylindrical inner surface which faces and is eccentric with a rotary shaft, the cylindrical inner surface being engageable with the hook member. A retaining mechanism is provided which yieldably retains the rotary body rotationally fast with the main case at a predetermined rotational position. Rotation of the rotary body causes relative reciprocal motion between the hook member and the main case such that the hook member reaches a desired position relative to the main case, whereby the first and second members are releasably fixedly secured to each other.

5 Claims, 7 Drawing Sheets

PRIOR ART

FIG. 7(b)

PRIOR ART

FIG. 7(c)

PRIOR ART

ASSEMBLING DEVICE

CROSS REFERENCE TO RELATED APPLICATION

The subject matter disclosed herein is related to subject matter disclosed in U.S. Ser. No. 07/294,763, filed Jan. 6, 1989.

FIELD OF THE INVENTION

This invention relates to an assembling device for assembling a member-to-be-fixed (or "object member") and a substrate member, and particularly to an assembling device which is effective for assembling a shelf board and a side board of furniture or the like.

BACKGROUND OF THE INVENTION

Heretofore, when a shelf board is attached to a side board in assembling furniture or the like, there has been adopted a procedure wherein one edge of the shelf board is supported from thereunder by a supporting pin which is mounted on the side board beforehand. In this case, the shelf board is merely placed on the supporting pin and, therefore, is easily removed when the lower surface of the shelf board is pushed up. Therefore, when furniture is moved for rearrangement or relocation at home, the shelf board sometimes accidentally comes off and can result in injury or damage. Also, since the shelf board does not function as a strength member, the outer frame alone is unable to provide sufficient strength for a bookshelf, etc. and it tends to diagonally deform or otherwise the side board thereof is sometimes expanded sideward when goods are placed on the top board.

Figure 7A:
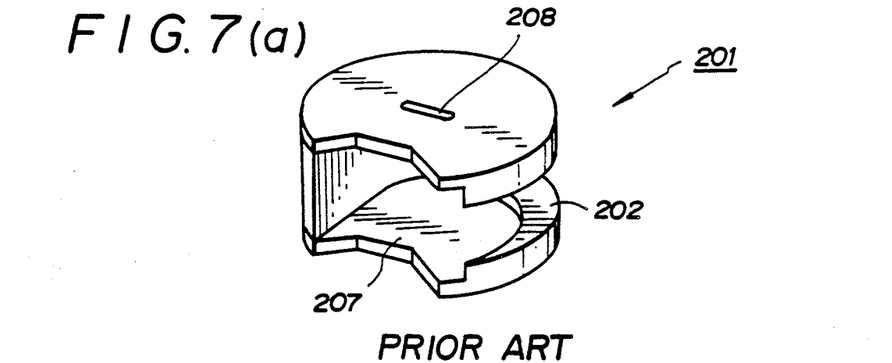
FIG. 7(a) is a perspective view of a prior art assembling device.
Figure 7B:
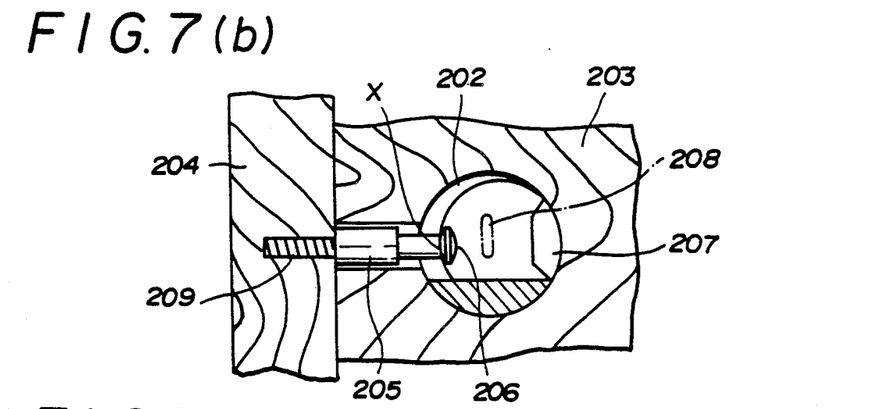
FIG. 7(b) is a sectional top view of a shelf board and a side board assembled by the prior art device of FIG. 7(a)
Figure 7C:
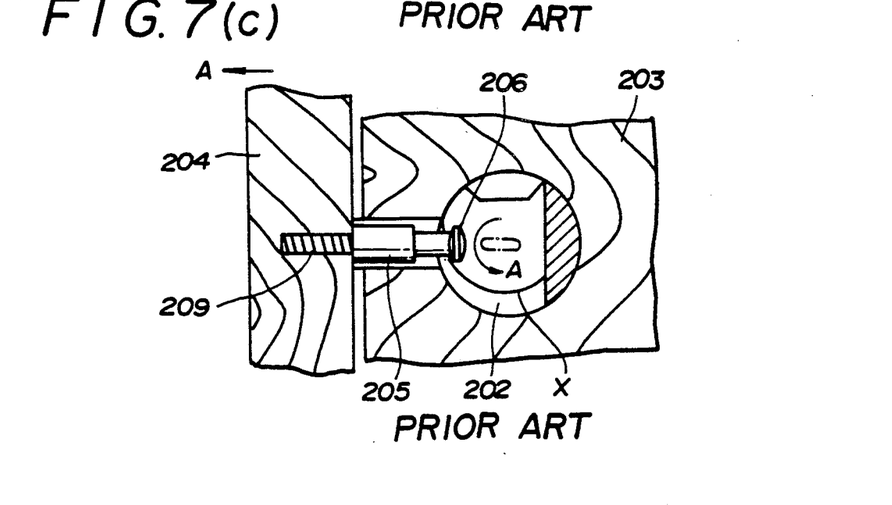
FIG. 7(c) is a sectional top view in which the projecting amount of a screw is short.

Therefore, there was developed a conventional assembling device 201 which, as shown in FIG. 7(*a*) and FIG. 7(*b*), is formed in a purse shape and includes an eccentric cam 202 formed on an inner surface thereof. The assembling device 201 is rotatably mounted to a shelf board 203. A head portion 206 of a screw 205 threadedly engaged with a side board 204 is inserted into an inserting opening 207 of the assembling device 201 so that the screw shank can project out through the slot between the axially opposed cam parts. Then, a driver (not shown) is inserted into a driver groove 208 and turned clockwise as shown in the figure. As a result, the screw 205 is drawn into the assembling device 201 as the device 201 moves toward the side board 204 by means of the function of the eccentric cam 202 in the manner as shown in FIG. 7(*b*). The head portion 206 is retained at or beyond an over-center change point X. The change point X basically represents the point on the concave surface of the cam 202 which must be rotated to the screw axis in order to achieve maximum engagement of the screw head 206 against the concave surface (see FIGS. 7(*b*) and 7(*c*)). As a consequence, the shelf board 203 and the side board 204 are integrally formed.

In the conventional assembling device 201, however, when the shelf board 203 and the side board 204 are integrally formed, if the outwardly projecting length of the screw 205 is small, then the head portion 206 is retained before it reaches the over-center change point X. Therefore, when an external force is applied to the side board 204 in the direction as shown by arrow A in FIG. 7(*c*), the assembling device 201 is pulled by the head portion 206 of the screw 205 and turns counterclockwise in the figure. As a result, the connection between the side board 204 and the shelf board 203 is loosened. On the other hand, when the projecting length of the screw 205 is large, the side board 204 and the shelf board 203 cannot be integrally fixed with each other, since the head portion 206 never engages the cam 202. Therefore, when the side board 204 and the shelf board 203 are assembled together, the projecting length of the screw 205 must be accurately adjusted beforehand. Since it requires a number of initial adjustments to achieve the correct projecting length of the screw, working performance and production efficiency are difficult to obtain.

Therefore, the following construction is employed in the present invention in an attempt to solve the above-mentioned problems.

SUMMARY OF THE INVENTION

The subject matter of the present invention is an assembling device having a main case mounted on a first member and having an inserting opening for receiving therein a head portion of a hook member, the hook member projecting from a second member. A rotary body is rotatably disposed within said main case and has a cylindrical inner surface which is eccentric with a rotary shaft. The rotary body is engagable at said cylindrical inner surface with the head portion of said hook member, which head portion is received in the main case through said inserting opening. Retaining means is disposed at said rotary body or at said main case and is adapted to yieldably retain said rotary body to said main case at a predetermined rotational position. Rotation of said rotary body causes relative reciprocal motion between the head portion of said hook member and said main case so that the head portion reaches a desired reciprocal position relative to the main case, whereby said second member and said first member are fixedly secured to each other. In an assembling device having the above-mentioned construction according to the present invention, the main case is first mounted on the first member. Then, the head portion of the hook member projecting from the second member is inserted into the main case until it is engaged with the cylindrical inner surface. When the rotary body is rotated, the head portion of the hook member slides along the cylindrical inner surface, pulling the main case toward the first member. At this time, the main case is not rotated from the above-mentioned mounting position and only the rotary body is rotated. Rotation of the rotary body is stopped after it reaches a desired rotational position, to affix the first member to the second member. The rotary body and the main case are yieldably retained rotationally fast by a retaining means, to maintain the desired rotational position of the rotary body. When a rotational force is applied to the rotary body again, the retaining means yields, thereby permitting the rotary body to be rotated to another desired position. As a result, the first and second members can be releasably fixed together.

The first and second members both normally comprise plate-like or panel-like members which extend in generally perpendicular relation to one another. In addition, the members can be detached with ease, and the mounting position can be corrected with ease.

DETAILED DESCRIPTION

A first embodiment of the present invention will now be described with reference to the accompanying drawings.

Figure 1:
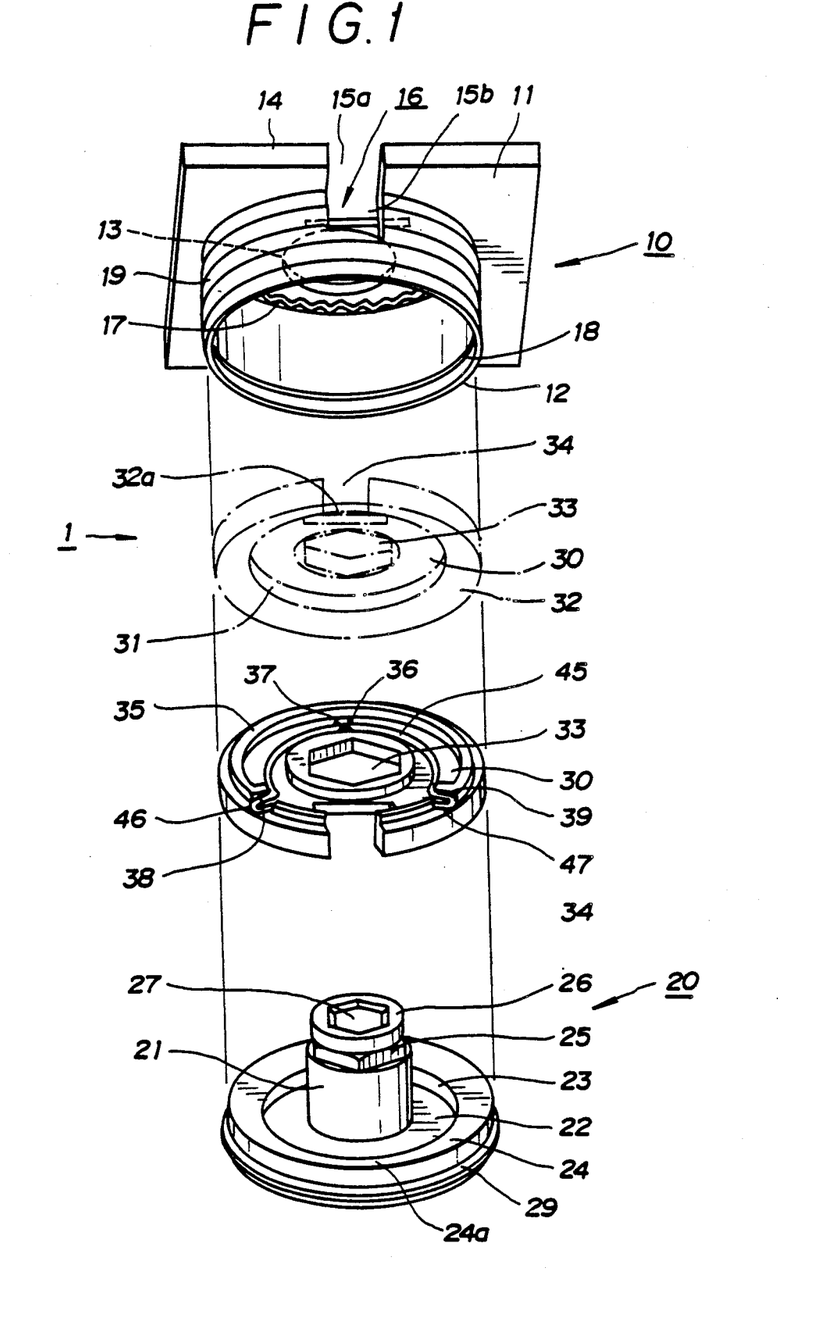
FIG. 1 is an exploded perspective view of an assembling device according to one embodiment.

As is shown in FIG. 1, an assembling device 1 comprises a main case 10 and a rotary body 20 mounted in the main case 10.

The main case 10 comprises a rectangular end or base plate 11 and a cylindrical case 12 projecting from the center of a lower surface of the base plate 11. The base plate 11 is provided at the center thereof with a circular hole 13 for permitting a rotary shaft 21 of the rotary body 20 to be loosely engaged therein, and one edge 14 of the base plate 11 is formed at the center thereof with a generally T-shaped slot or cut-out 15a directed toward the circular hole 13. The cylindrical case 12 is provided with a cut-out 15b formed by cutting out a part of case 12 immediately under the cut-out 15a. An inserting opening 16 is formed by the cut-outs 15a and 15b. Further, the cylindrical case 12 is provided at an upper inner surface thereof with a click projection 17 equivalent to one obtained by dividing the circumference of the cylindrical case into 30 equal parts. As shown in FIGS. 1 and 4(c), the click projection 17 extends circumferentially along the upper inner surface of the cylindrical case and has a substantially serrated inner edge defining a series of closely circumferentially spaced notches, for example, 17a. The inner surface of a lower portion of the cylindrical case 12 is formed with an annular undercut engaging groove 18 adapted to permit the rotary body 20 to be engaged therein. Furthermore, the cylindrical case 12 is provided on its outer peripheral surface with a serrated retaining step portion 19 as shown in section in FIG. 3(a). As is apparent from FIG. 3(a), when mounted in a cylindrical bore or opening formed in a plate-like shelf board 50, the assembling device 1 is firmly fixed to the shelf board 50 by the retaining step portion 19.

The rotary body 20 comprises a lower cylindrical disk 22 integrally coaxially formed at a lower end of the rotary shaft 21. An upper circular disk 30 is nonrotatably engaged with an upper end portion of the rotary shaft 21. Since the rotary body 20 has the disks 22 and 30 at opposite ends of thereof, it exhibits a reel-like (or spool) configuration. The axially opposing inner surfaces of the disks 22, 30 are respectively provided with ring-like cams 24, 32 having respective cylindrical inner cam surfaces 23, 31 which are radially eccentric with respect to the axis of rotary shaft 21. The disks 22 and 30 are arranged such that the radially thinnest portions 24a and 32a of the respective eccentric cams 24 and 32 overlie each other in a superposing aligned fashion, thereby to form the rotary body 20. A hexagonal opening 33 is formed at the center of the upper disk 30, and a hexagonal portion 25 formed on an upper portion of the rotary shaft 21 is received in the opening 33 such that both of the disks 22 and 30 and shaft 21 are integrally engaged and nonrotationally fixed to one another in the relative position mentioned above. As a result, the rotary shaft 21 has formed therearound a cam groove 40 having a T-shaped cross section as formed by the rotary body 20 and the spaced disks 22 and 30, particularly the cylindrical inner cam surfaces 23 and 31, as shown in FIG. 3(a).

Figure 3A:
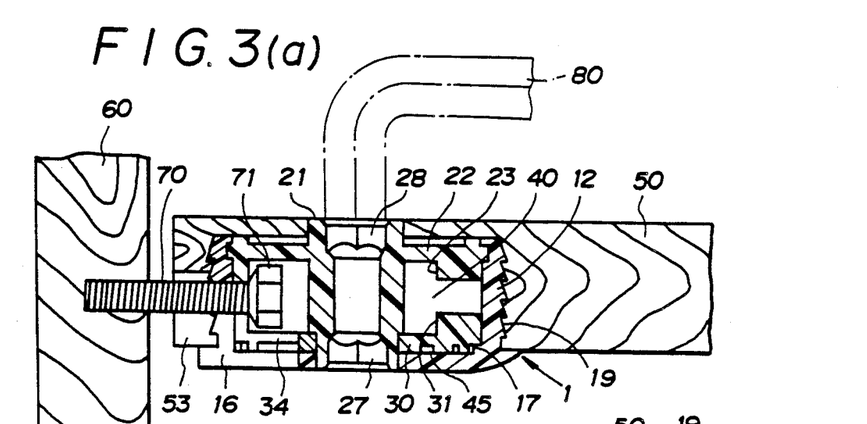
FIG. 3(a) is a partially sectioned plan view of the shelf board and the side board prior to being fixed together by the assembling device of FIG. 1.

Also, the upper end of the rotary shaft 21 is a cylindrical portion 26 which can be loosely rotatably engaged in the circular hole 13 of the base plate 11, whereas the lower end of the rotary shaft 21 projects for a predetermined amount from the lower disk 22 as shown in FIG. 3(a). Further, the upper and lower ends of the rotary shaft 21 are formed with hexagonal wrench holes 27 and 28 for permitting a hexagonal wrench 80 to be engaged therein as will be described hereinafter. The lower disk 22 is provided with a rib-like engaging ring 29 projecting from the outer peripheral surface thereof and being engagable by means of a snap fit within the engaging groove 18 when the rotary body 20 is mounted in the main case 10.

The upper disk 30 is provided with a generally T-shaped cut-out or slot 34 similar to the cut-out 15a and directed radially inwardly toward the center from the thinnest wall portion 32a of the eccentric cam 32. The cut-out 34 is adapted to receive a bolt head 71 of a bolt 70 (bolted into a plate-like side board 60 as an object member) when in alignment with the inserting opening 16 as shown in FIG. 3(a). The upper disk 30 is provided with a concentric rib-like ring 35 projecting upwardly from the upper surface thereof, which ring 35 is spaced inwardly a small amount from the circumferential wall of the disk. Further, the upper disk 30 is provided on its upper surface with a click spring 45 extending circumferentially along the inside of the ring 35. The spring 45 is held between superposed projections 36 and 37 secured to and extending inward from the ring 35. The ends of the click spring 45 include engaging portions 46 and 47 which project radially outwardly through respective cut-outs or slots 38 and 39 formed in the ring 35 for engaging with click projections 17 so as to retain the rotary body 20 to the main case 10 and yieldably resist relative rotation therebetween. The spring 45 is supported on the upper disk 30 in an elastically deformed C-shaped configuration so that portions 46 and 47 are resiliently urged radially outward for normal engagement with click ring 17. In this embodiment, the click ring 17 and the click spring 45 function as a retaining means to normally prevent relative rotation between case 10 and body 20.

Next, with reference to FIG. 2, FIG. 3(a) through FIG. 3(c), and FIG. 4(a) through FIG. 4(c), there will be described one example for fixedly assembling the shelf board 50 and side board 60 using the assembling device 1.

Figure 2:
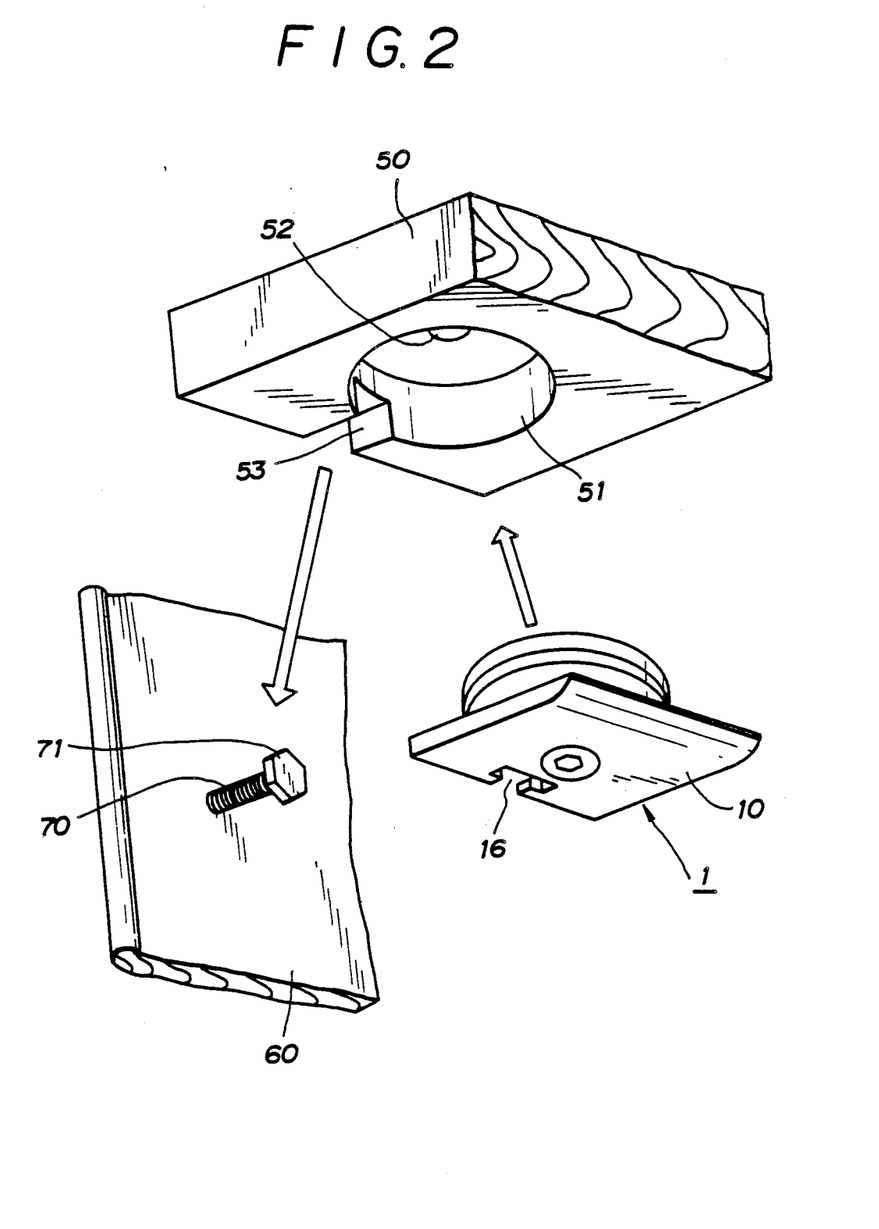
FIG. 2 is a perspective view showing one example of assembling a shelf board to a side board with the assembling device of FIG. 1.

The assembling device 1 is press-fitted from underneath into a cylindrical mounting opening 51 formed in a predetermined position in the lower surface of the shelf board 50 as shown in FIG. 2. The opening 51, at the center of its ceiling (upper) surface, is formed with a circular hole 52 of smaller diameter extending through the board 50 for permitting the rotary shaft 21 to be loosely inserted therein as shown in FIG. 3(a). Likewise, shelf board 50 has a guide groove 53 or slot formed therein and extending inwardly from the board edge so as to radially intersect the peripheral wall of the opening 51 as shown in FIG. 2. This groove 53 also opens through the bottom surface of board 50. Then, the shelf board 50 with the assembling device 1 mounted thereon is disposed in such a manner as to receive a bolt 70 fixed at a predetermined position to the side board 60 so that the bolt 70 is inserted into the main case 10 through the guide groove 53, the cut-out 34, and the inserting opening 16, all of which are aligned, as shown in FIGS. 2 and 3.

Figure 3B:
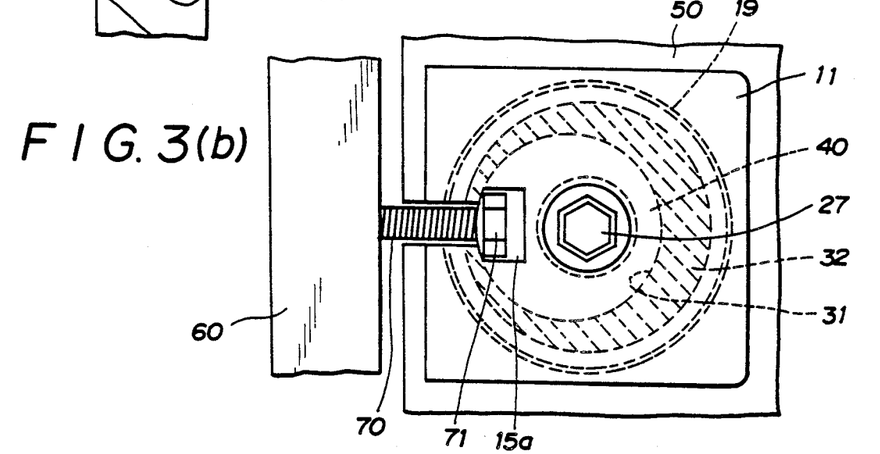
FIG. 3(b) is a bottom view of FIG. 3(a)
Figure 3C:
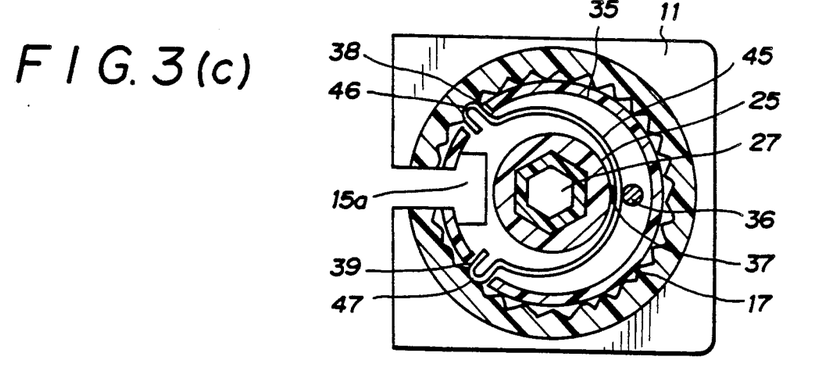
FIG. 3(c) is a sectional view at the lower surface of the shelf board in FIG. 3(a)
Figures 4A, 4B:
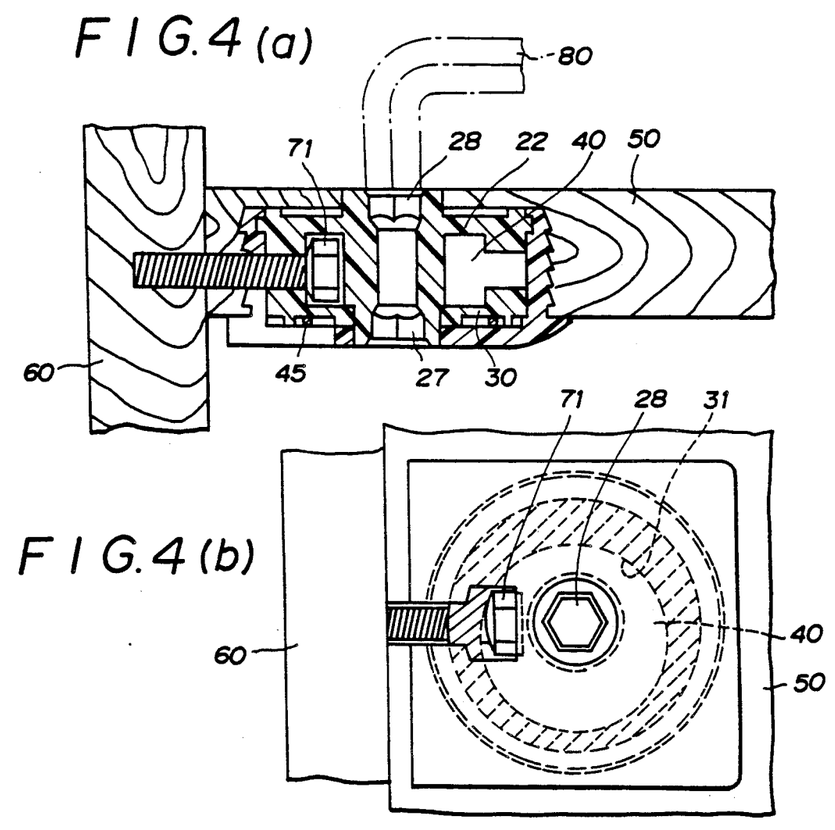
FIG. 4(a) is a partially sectioned plan view of the shelf board and the side board fixed together by the assembling device of FIG. 1.
FIG. 4(b) is a bottom view of FIG. 4(a)
Figure 4C:
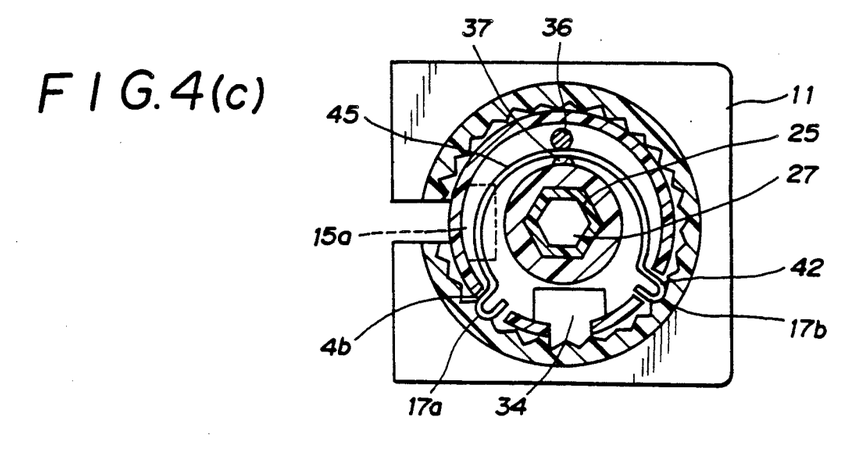
FIG. 4(c) is a sectional view at the lower surface of the shelf board in FIG. 4(a)

As shown in FIG. 3(a), the hexagonal wrench 80 is brought into engagement with the wrench hole 28 and turned clockwise (or counterclockwise) as viewed in FIG. 3(b) to rotate the rotary body 20. As a result, the bolt head portion 71 is engaged with the rotating cylindrical inner cam surfaces 23 and 31 of the cam groove 40 and slides therealong to forcibly pull the case 10 and board 50 toward the side board 60 so that the boards 60 and 50 are brought closer to each other. When both the disks 22 and 30 are rotated 90° (compare FIGS. 3(c) and 4(c)) in this example, the side board 60 and shelf board 50 are intimately attached together in snug abutment as shown in FIG. 4(a) through FIG. 4(c). In the meantime, the engaging portions 46 and 47 of the click spring 45 slide across the click projections 17 through 90° so as to ultimately resiliently engage the notches or valley portions 17a and 17b of the click projections 17 when the 90° rotation is completed, thereby yieldably retaining the rotary body 20 to the main case 10 at the 90° rotated position. In this way, since the assembling device 1 is firmly retained at a predetermined rotational position by the click spring 45, the rotary body 20 is not rotated even when there is applied a separating force for urging the side board 60 leftward in FIG. 4(b), and the side board 60 and the shelf board 50 are not separated. On the other hand, when a reverse rotational force is applied to rotary body 20 by the hexagonal wrench 80, the click spring 45 again slides along the click ring 17 to allow the assembling device 1 to be rotated to the released position as shown in FIG. 3(a) through FIG. 3(c). Therefore, the shelf board 50 can be removed from the side board 60 with ease.

As described in the foregoing, according to the present invention, the shelf board 50 and the side board 60 can be fixedly attached with ease and without fail. Further, the shelf board 50 can be removed with ease. Furthermore, the rotary body 20 can be retained to the main case 10 at a desired rotational position by the click (i.e. detent) spring 45 and the click (i.e. detent) projection ring 17. Also, the main case 10 is firmly attached to the shelf board 50 by means of the serrated retaining step portion 19. Accordingly, even when an external force is applied to the side board 60 in the direction for separating it from the shelf board 50, the rotary body 20 is not rotated. Therefore, the shelf board 50 and the side board 60 can be firmly attached without using any other fixing devices. Also, since the cam groove 40 is formed between the two disks 22 and 30 which are interconnected only through the rotary shaft 21 at the center thereof, and since the cam groove 40 nearly completely surrounds the rotary shaft 21, the rotary body 20 can be rotated in either direction to secure the boards. Thus, the same assembling device 1 can be applied to either the right end or the left end of the shelf board 50, and the assembler can turn the hexagonal wrench 80 either clockwise or counterclockwise according to necessity. That is, the assembling device 1 according to the present invention can be used for various purposes irrespective of its mounting place and has an excellent workability. Furthermore, since the wrench holes 27 and 28 are formed in vertical relation at opposite ends of the rotary shaft 21, the hexagonal wrench 80 can be applied and manipulated from either side of the shelf board 50. Since the rotary body 20 can be retained at a desired rotational position by the click spring 45, the projecting amount of the bolt 70 need not be uniform. That is, the problem with the prior art illustrated by FIG. 7(c) is alleviated. Therefore, the assembling device 1 exhibits an excellent workability when the bolt 70 is secured.

A second embodiment will now be described with reference to FIG. 5. As apparent from the figure, component parts similar to those of the first embodiment are denoted by the corresponding reference numbers increased by 100 respectively, and corresponding descriptions thereof will be omitted.

An assembling device 101 of the second embodiment includes the feature that rotation of the rotary body 120 is limited so that a fastening position and a release position are easily determined during operation of the assembling device 101.

Figure 5:
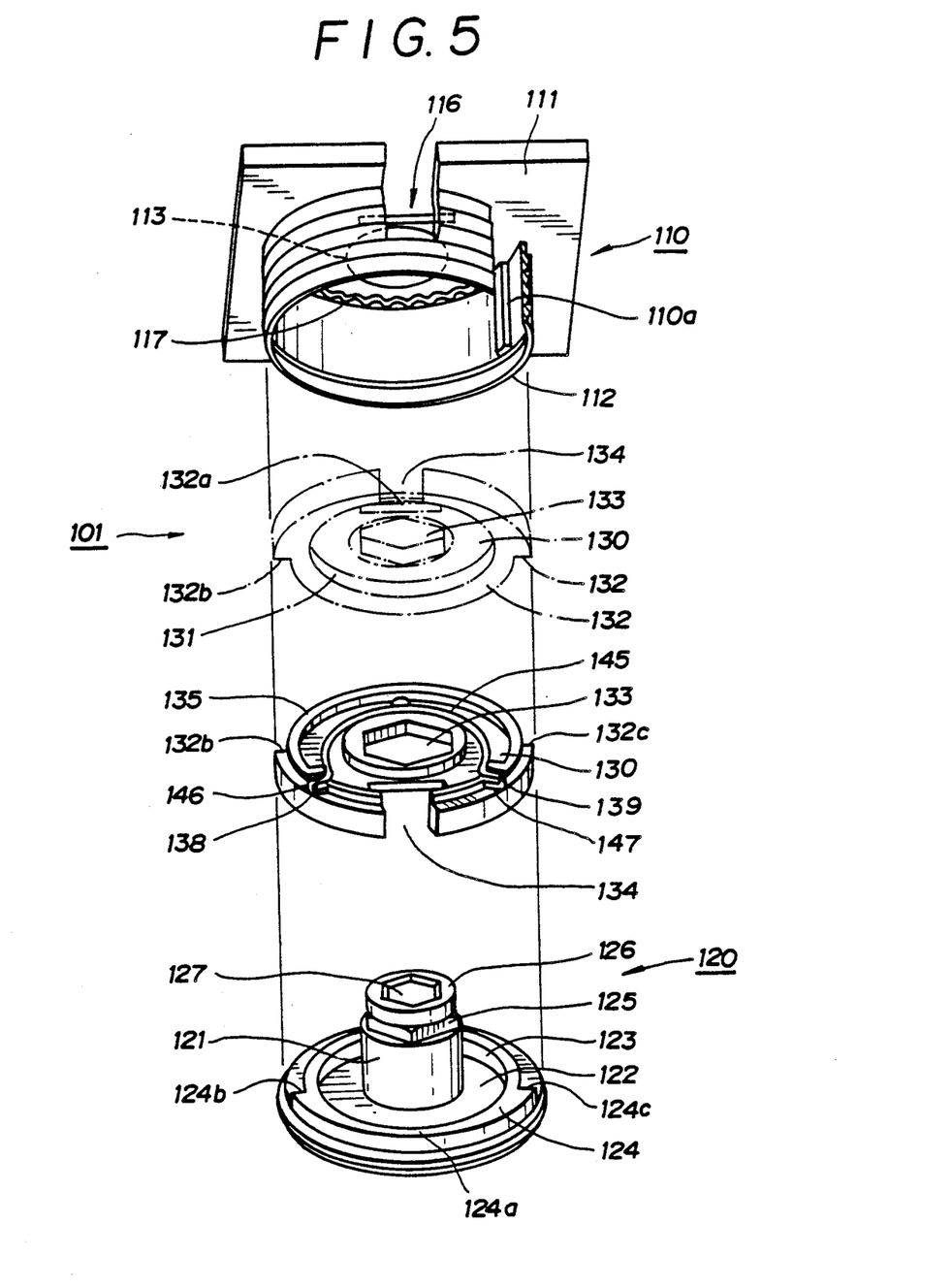
FIG. 5 is an exploded perspective view of a second embodiment.

A main case 110 of the assembling device 101 includes an axially extending rib-like stop 110a at a predetermined circumferential position on the inner wall 112 as shown in FIG. 5. Also, the rotary body 120 includes stops 124b, 124c, 132b and 132c which are includes formed by cutting out a portion of the radially external side surfaces of the eccentric cams 124 and 132 over a predetermined circumferential extent. The stops 124c and 132c are located such that when they are engaged with the stopper 110a, a cut-out 134 in the rotary body 120 is brought to a position in alignment with an inserting opening 116 in the main case 110, whereas the detents 124b and 132b are disposed such that they are engaged with the stopper 110a when the rotary body 120 is rotationally located at the maximum fastening position or slightly beyond the maximum fastening position.

In this embodiment, therefore, when the rotary body 120 is rotated in the fastening direction, it can be prevented from rotating beyond the maximum fastening position, thus avoiding loosening of the fastening again. As a result, when the substrate member and the object member are fixed together, insufficient fastening due to excessive rotation of the rotary body 120 is prevented since the rotary body 120 is rotated to a position where the detents 124b and 132b engage the stopper 110a, so the rotary body 120 is unable to be rotated any further in the fastening direction. The rotary body 120 is rotated in the releasing direction away from the fastening position until it is stopped, that is, until the stops 124c and 132c engage the stopper 110a, whereby the body 120 is thus in the release position. Therefore, assembling and releasing work can be performed with ease and without failure.

Although embodiments of the present invention have been described in detail above, the present invention is in no way limited to them but various changes and modifications may be made without departing from the spirit of the appended claims.

Figure 6:
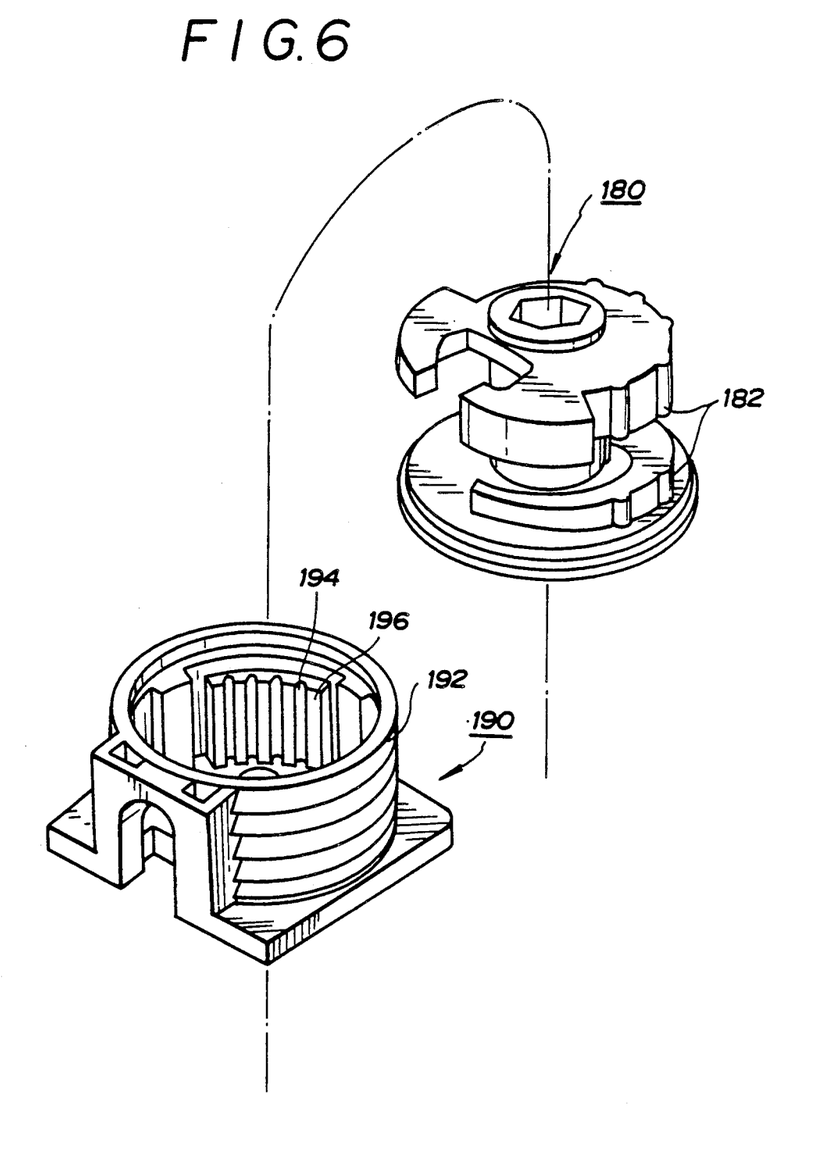
FIG. 6 is a perspective view showing a modified embodiment of the assembling device wherein a main case is shown upside down.

For example, the rotary bodies 20 and 120 may be integrally formed in a reel (or spool) shape. The rotary bodies are not limited to the reel shape, as long as they are formed with a cylindrical inner cam surface eccentric about the rotary shaft. They may have only one disk. Furthermore, the material of the assembling devices 1, 101 may be metal, wood, etc., and it may be properly selected according to an object to which it is applied. The retaining means may be of any type as long at it can yieldably retain the main case and the rotary body against relative rotation. The retaining means may of course be made to have substantially the same function as those of the above-mentioned embodiments. For example, as shown in FIG. 6, in case the retaining means comprises a plurality of ribs or knobs 182 formed on the outer periphery of the rotary body 180 and an elastically deformable plate 196 erected on the inner side of a cylindrical case 192 and provided at the inner periphery with a plurality of recesses 194, there can be obtained the same function and effect as that of the embodiments. Similarly, the knobs may be formed on the elastic curved plate 196 and the recesses may be formed on the rotary body 180.

Furthermore, the device of the present invention can be used not only for fastening together the side board and the shelf board, but it may likewise be used for joining the ends of two plates or for framing furniture.

As described in the foregoing, according to the present invention, an object member and a substrate member can be fixedly joined with ease and without fail. Further, the processes required for maintaining accuracy in mounting a hook member to the object member can be reduced and simplified, and workability and production efficiency can be greatly improved.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An assembling device for releasably fixedly securing first and second plate-like members together, comprising:
    an annular case adapted to be fixedly positioned within an opening in said first member, said case having an annular outer peripheral wall, said outer peripheral well having an opening extending radially therethrough;
    an engagement member fixed to and projecting from said second member;
    means for forcibly pulling said first member and said second member into snug mutual abutment, including
        a rotary body rotatably disposed about an axis in said case, said rotary body having a substantially spool-like construction including a rotary shaft and first and second axially spaced disks disposed at opposite ends of said rotary shaft and rotationally fast therewith, mutually facing axial surfaces of said first and second disks each having an annular cam portion projecting axially therefrom, said cam portions having radially inner cam surfaces which are spaced from and eccentric about said rotary shaft, said cam surfaces lying substantially in a common cylinder, said second disk having a cut-out opening at its radially outer edge, said cut-out opening extending circumferentially for a predetermined amount and extending radially completely through said second disk cam portion, said rotary body being rotatable relative to said case to radially align said cut-out opening with said case opening, said rotary body also including means located axially outside of each said disk for facilitating rotation of said rotary body;
    said engagement member being insertable through said aligned cut-out opening and case opening into a space defined axially between said disks and radially inside said cam surfaces, said engagement member having means defining an engagement surface for slidable engagement with at least one of said cam surfaces as said rotary body rotates; and
    retaining means coacting between said case and said rotary body for yieldably retaining said rotary body rotationally fast with said case, including at least one resilient radial projection and a plurality of radially opening notches formed respectively on one and the other of an inner peripheral wall of said case and a radially outer peripheral edge of one of said disks, said resilient radial projection being yieldably engageable in said notches.

2. The apparatus according to claim 1, wherein said cam surfaces are substantially perpendicular to said mutually facing disk surfaces, said cam portions being axially spaced from each other, said cam portions, said disk surfaces and a peripheral surface of said rotary shaft defining between said disks an annular groove having a substantially T-shaped cross-section and substantially completely surrounding said rotary shaft, said engagement member being received in said T-shaped groove, and said engagement surface engaging both of said cam surfaces.

3. An assembling device for releasably fixedly securing first and second plate-like members together, comprising:
    an annular case adapted to be fixedly positioned within an opening in the first member, said case having an annular outer peripheral wall, said outer peripheral wall having an opening extending radially therethrough;
    an engagement member fixed to and projecting from the second member; and
    a rotary body rotatably disposed about an axis in said case, said rotary body having a substantially spool-shaped construction including a rotary shaft and first and second axially spaced disks which are disposed adjacent opposite ends of said rotary shaft and are rotationally fast therewith, mutually facing axial surfaces of said first and second disks having an annular cam portion projecting axially therefrom, said cam portions defining radially inwardly facing cam surfaces which are spaced from and eccentric about said rotary shaft, said second disk having a cut-out opening at its radially outer edge, said cut-out opening extending circumferentially for a limited extent and extending radially completely through said cam portion of said second disk, said rotary body being rotatable relative to said case to radially align said cut-out opening with said case opening, said engagement member being insertable through said aligned cut-out opening and case opening into a space defined axially between said disks and radially inside said cam surfaces, said spool-shaped rotary body including means located axially outside of at least one of said disks for facilitating rotation of said rotary body, and said engagement member having means defining an engagement surface for slidable engagement with at least one of said cam surfaces as said rotary body rotates.

4. The assembling device according to claim 3, wherein said rotation facilitating means is defined by at least one said end of said rotary shaft which extends axially through the associated said disk and defines a tool engaging structure for cooperation with a tool to rotate said rotary body, said tool engaging structure being disposed axially outside of said disk relative to said spool-shaped rotary body.

5. The assembling device according to claim 3, including retaining means coacting between said rotary body and said case for yieldably retaining said rotary body rotationally fast with said case at selected rotational orientations of said rotary body relative to said case.

* * * * *